US009954215B2

(12) United States Patent
Pevear

(10) Patent No.: US 9,954,215 B2
(45) Date of Patent: Apr. 24, 2018

(54) BATTERY WITH INTEGRATED POWER MANAGEMENT SYSTEM AND SCALABLE BATTERY CUTOFF

(75) Inventor: Brian J. Pevear, Lakewood Ranch, FL (US)

(73) Assignee: A123 Systems, LLC, Waltham, MA (US)

( * ) Notice: Subject to any disclaimer, the term of this patent is extended or adjusted under 35 U.S.C. 154(b) by 967 days.

(21) Appl. No.: 13/513,665

(22) PCT Filed: Dec. 6, 2010

(86) PCT No.: PCT/US2010/059127
§ 371 (c)(1),
(2), (4) Date: Jan. 4, 2013

(87) PCT Pub. No.: WO2011/069162
PCT Pub. Date: Jun. 9, 2011

(65) Prior Publication Data
US 2013/0101874 A1    Apr. 25, 2013

Related U.S. Application Data

(60) Provisional application No. 61/266,724, filed on Dec. 4, 2009.

(51) Int. Cl.
*H01M 2/34* (2006.01)
*H01M 10/42* (2006.01)
*H02J 7/00* (2006.01)

(52) U.S. Cl.
CPC ......... *H01M 2/34* (2013.01); *H01M 10/4257* (2013.01); *H02J 7/0026* (2013.01);
(Continued)

(58) Field of Classification Search
None
See application file for complete search history.

(56) References Cited

U.S. PATENT DOCUMENTS

| 3,314,824 A | 4/1967 | Spanur |
| 3,634,810 A | 1/1972 | Pemberton |

(Continued)

FOREIGN PATENT DOCUMENTS

| DE | 19705192 A1 | 10/1997 |
| EP | 0967700 A1 | 12/1999 |

(Continued)

OTHER PUBLICATIONS

Supplemental European Search Report for European App. No. 10835253.5, dated Feb. 5, 2014. 7 pages.

(Continued)

*Primary Examiner* — Barbara Gilliam
*Assistant Examiner* — Angela Martin
(74) *Attorney, Agent, or Firm* — McCoy Russell LLP

(57) ABSTRACT

The present disclosure relates battery with an integrated power management system and scalable cutoff component, the battery system including a battery housing with first and second voltage output terminals, a plurality of rechargeable battery cells within the battery housing and having first and second voltage terminals; a power management system for generating an external control signal and an internal control signal based upon monitored operating parameters of the plurality of rechargeable battery cells, said external control signal for controlling an external power source and/or an external load, said power management system forming an integral part of the battery system; and a cutoff switch circuit within the battery housing and for making and breaking a conductive path between the first voltage terminal of the plurality of battery cells and the first voltage output terminal of the battery housing in response the internal control signal from the battery management system.

11 Claims, 7 Drawing Sheets

(52) U.S. Cl.
CPC ... *H02J 7/0031* (2013.01); *H01M 2010/4271* (2013.01); *H01M 2200/108* (2013.01); *H02J 2007/004* (2013.01); *H02J 2007/0037* (2013.01)

(56) References Cited

U.S. PATENT DOCUMENTS

| | | | |
|---|---|---|---|
| 4,532,443 A * | 7/1985 | Glennon | H03K 17/122 327/404 |
| 4,567,119 A | 1/1986 | Lim | |
| 5,071,652 A | 12/1991 | Jones et al. | |
| 5,158,842 A | 10/1992 | McHenry | |
| 5,162,164 A | 11/1992 | Dougherty et al. | |
| 5,162,171 A | 11/1992 | Jones | |
| 5,168,017 A | 12/1992 | Jones et al. | |
| 5,254,415 A | 10/1993 | Williams et al. | |
| 5,310,609 A | 5/1994 | Earl et al. | |
| 5,338,624 A | 8/1994 | Gruenstern et al. | |
| 5,354,630 A | 10/1994 | Earl et al. | |
| 5,397,661 A | 3/1995 | Kaun | |
| 5,401,595 A | 3/1995 | Kagawa et al. | |
| 5,643,693 A | 7/1997 | Hill et al. | |
| 5,756,227 A | 5/1998 | Suzuki et al. | |
| 5,841,649 A * | 11/1998 | Willett | H02M 7/53875 327/404 |
| 5,963,123 A | 10/1999 | Douglass | |
| 6,099,986 A | 8/2000 | Gauthier et al. | |
| 6,117,584 A | 9/2000 | Hoffman et al. | |
| 6,390,858 B2 | 5/2002 | Saito et al. | |
| 6,396,026 B2 | 5/2002 | Gillner et al. | |
| 6,529,559 B2 | 3/2003 | Reshef | |
| 6,548,206 B1 | 4/2003 | Gauthier et al. | |
| 6,590,440 B1 * | 7/2003 | Williams | H02J 7/0031 327/29 |
| 6,821,671 B2 | 11/2004 | Hinton et al. | |
| 6,828,755 B1 | 12/2004 | Iverson et al. | |
| 7,118,827 B2 | 10/2006 | Kruger et al. | |
| 7,270,912 B2 | 9/2007 | Oogami | |
| 7,319,304 B2 | 1/2008 | Veloo et al. | |
| 7,531,270 B2 | 5/2009 | Buck et al. | |
| 8,257,855 B2 | 9/2012 | Ijaz et al. | |
| 2002/0022178 A1 | 2/2002 | Asaka et al. | |
| 2003/0017384 A1 | 1/2003 | Marukawa et al. | |
| 2003/0091896 A1 | 5/2003 | Watanabe et al. | |
| 2003/0143458 A1 | 7/2003 | Asahina et al. | |
| 2004/0021442 A1 | 2/2004 | Higashino | |
| 2004/0028995 A1 | 2/2004 | Shelekhin et al. | |
| 2005/0077878 A1 * | 4/2005 | Carrier et al. | 320/134 |
| 2005/0146825 A1 | 7/2005 | Kaszeta et al. | |
| 2005/0221177 A1 | 10/2005 | Amagai et al. | |
| 2006/0051665 A1 | 3/2006 | Rigobert et al. | |
| 2006/0194101 A1 | 8/2006 | Ha et al. | |
| 2006/0234119 A1 | 10/2006 | Kruger et al. | |
| 2006/0292437 A1 | 12/2006 | Matsumoto et al. | |
| 2007/0141459 A1 | 6/2007 | Goto et al. | |
| 2007/0207377 A1 | 9/2007 | Han et al. | |
| 2008/0018300 A1 | 1/2008 | Zaag et al. | |
| 2008/0090137 A1 | 4/2008 | Buck et al. | |
| 2008/0103709 A1 | 5/2008 | Yun et al. | |
| 2008/0124617 A1 | 5/2008 | Bjork | |
| 2008/0129249 A1 * | 6/2008 | Ishishita | 320/136 |
| 2009/0053591 A1 | 2/2009 | Ikeda et al. | |
| 2009/0121683 A1 | 5/2009 | Goto | |
| 2009/0128093 A1 | 5/2009 | Barza et al. | |
| 2009/0142653 A1 | 6/2009 | Okada et al. | |
| 2009/0208815 A1 | 8/2009 | Dougherty | |
| 2009/0214941 A1 | 8/2009 | Buck et al. | |

FOREIGN PATENT DOCUMENTS

| | | |
|---|---|---|
| JP | 2000077056 A | 3/2000 |
| JP | 2002151045 A | 5/2002 |
| JP | 2003168410 A | 6/2003 |
| WO | WO-2007132991 A1 | 11/2007 |
| WO | WO-2008098193 A2 | 8/2008 |

OTHER PUBLICATIONS

International Search Report and Written Opinion for International Application No. PCT/US2010/059127 dated Feb. 2, 2011. 9 pages.
International Search Report and Written Opinion for International Application No. PCT/US10/020636 dated Mar. 8, 2010. 12 pages.
International Search Report and Written Opinion for International Application No. PCT/US10/020638 dated Mar. 31, 2010. 7 pages.
International Search Report and Written Opinion for International Application No. PCT/US10/20633 dated Mar. 17, 2010. 9 pages.
International Search Report and Written Opinion for International Application No. PCT/US10/20639 dated Mar. 30, 2010. 6 pages.
European Patent Office, Examination Report Issued in European Patent Application No. 10835253.5, dated Jan. 5, 2015, Germany, 5 pages.

* cited by examiner

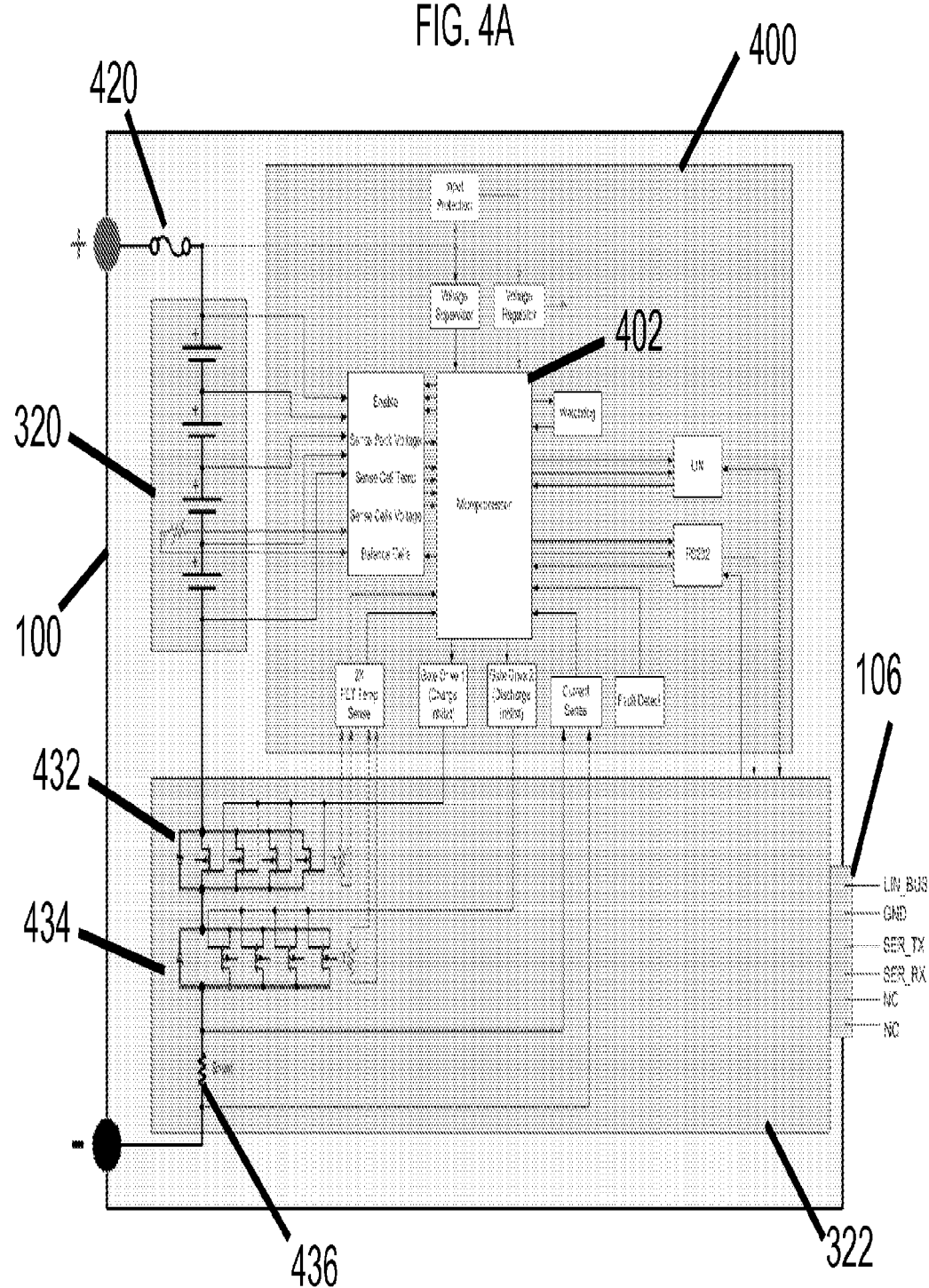

BATTERY WITH INTEGRATED POWER MANAGEMENT SYSTEM AND SCALABLE BATTERY CUTOFF

CROSS-REFERENCES TO RELATED APPLICATIONS

This application claims the benefit of U.S. Provisional Application 61/266,274, filed on Dec. 4, 2009, the entire contents of which are hereby incorporated by reference.

This application refers to U.S. patent application Ser. No. 12/628,809, filed on Dec. 1, 2009, entitled "Prismatic Automotive Battery with Scalable Architecture," (the "related application") the entire contents of which is incorporated herein by reference.

TECHNICAL FIELD

The present disclosure relates to batteries and scalable architectures for manufacturing batteries.

BACKGROUND

A rechargeable battery may be used in terrain, marine, or aeronautic vehicles in various applications. One application is as a starter battery to drive the starter motor of the vehicle. Starter battery applications may require high electrical currents to drive the starter motor, and the ability to be recharged from the vehicle's alternator. Most current automotive starter batteries are of lead acid construction. However, lithium-ion (Li-Ion) batteries may be used instead of lead acid batteries. Li-Ion batteries can provide improved power-to-weight ratios, longer cycle lives, and environmental benefits due to the lack of lead.

A second application for Li-Ion batteries in vehicles is to provide power for micro-hybrid (start-stop) drive systems. Unlike some hybrid cars, where a relatively high-voltage battery is used to drive an electric motor that is used for vehicle propulsion, cars with micro-hybrid systems are propelled by conventional internal combustion engines. However, in micro-hybrid cars, the engine is automatically turned off when the car is stopped (e.g., at a traffic light) and then started back up when the driver presses the accelerator to drive off. This start-stop technique reduces emissions without requiring significant infrastructure changes to existing car designs. However, micro-hybrid applications also require batteries that can withstand the frequent charge-discharge cycles caused by constantly restarting the engine. Li-Ion batteries have performance characteristics that are better matched for such applications than lead-acid batteries.

SUMMARY

In one aspect, the present disclosure relates to a battery with an integrated power management system and scalable cutoff component. In one embodiment, the battery system includes a battery housing with first and second voltage output terminals, a plurality of rechargeable battery cells within the battery housing and having first and second voltage terminals; a power management system for generating an external control signal and an internal control signal based upon monitored operating parameters of the plurality of rechargeable battery cells, said external control signal for controlling an external power source and/or an external load, said power management system forming an integral part of the battery system; and a cutoff switch circuit within the battery housing and for making and breaking a conductive path between the first voltage terminal of the plurality of battery cells and the first voltage output terminal of the battery housing in response the internal control signal from the battery management system.

In one embodiment, the battery cells are lithium ion cells. In some embodiments, the cutoff switch includes a plurality of metal-oxide semiconductor field effect transistors (MOSFETs). In some embodiments, the plurality of MOSFETs are arranged as groups of parallel MOSFETs. In some embodiments, the plurality of MOSFETs include a first group of MOSFETs connected in parallel with each other and a second group of MOSFETs connected in parallel with each other and wherein the first group is connected in series with the second group. In some embodiments, the battery system includes a busbar in electrical communication with the plurality of rechargeable battery cells and MOSFETs. In some embodiments, the battery system includes a shunt resistor in electrical communication with the plurality of MOSFETs. In some embodiments, the battery system includes a temperature sensor in thermal communication with the MOSFETs. In some embodiments, the battery is an automotive battery. In some embodiments, the external power source can be an alternator. In some embodiments, the battery is a telecommunications battery.

Another aspect of the present disclosure relates to a method for operating a battery system with an integrated power management system and scalable cutoff component. The method includes: monitoring operating parameters of a plurality of rechargeable battery cells within a battery housing; generating an external control signal and an internal control signal based upon the monitored operating parameters of a plurality of rechargeable battery cells, said external control signal for controlling an external power source and/or an external load; and making or breaking a conductive path between the first voltage terminal of the plurality of battery cells and the first voltage output terminal of the battery housing in response to the internal control signal.

In some embodiments, the operating parameters include voltage across a shunt resistor within the battery housing. In some embodiments, the operating parameters include temperature and voltage across a plurality of metal-oxide semiconductor field effect transistors (MOSFETs) within the battery housing. In some embodiments, the making or breaking a conductive path includes activating a cutoff switch including a plurality of metal-oxide semiconductor field effect transistors (MOSFETs).

BRIEF DESCRIPTION OF THE FIGURES

For a fuller understanding of the nature and objects of the present disclosure, reference should be made to the following detailed description taken in connection with the accompanying drawings in which the same reference numerals are used to indicate the same or similar parts wherein:

FIG. 4A shows a power management system for an automotive battery.

DESCRIPTION

The disclosed battery consists of an assembly of cell subassemblies, each containing prismatic Li-Ion battery cells, where the cells are electrically connected to the other cells in the module to form the battery. The term prismatic refers to the shape of the battery cell and it differentiates this module from other modules with cylindrical battery cells. The battery has an integrated power management system that provides passive (through control of components external to the battery) and active (through internal controls) protection against over-charge, over-discharge, over-temperature, and over-current. The battery also includes a scalable battery cutoff component controlled by the power management system. The battery can be, for example, an automotive battery.

Figure 1:
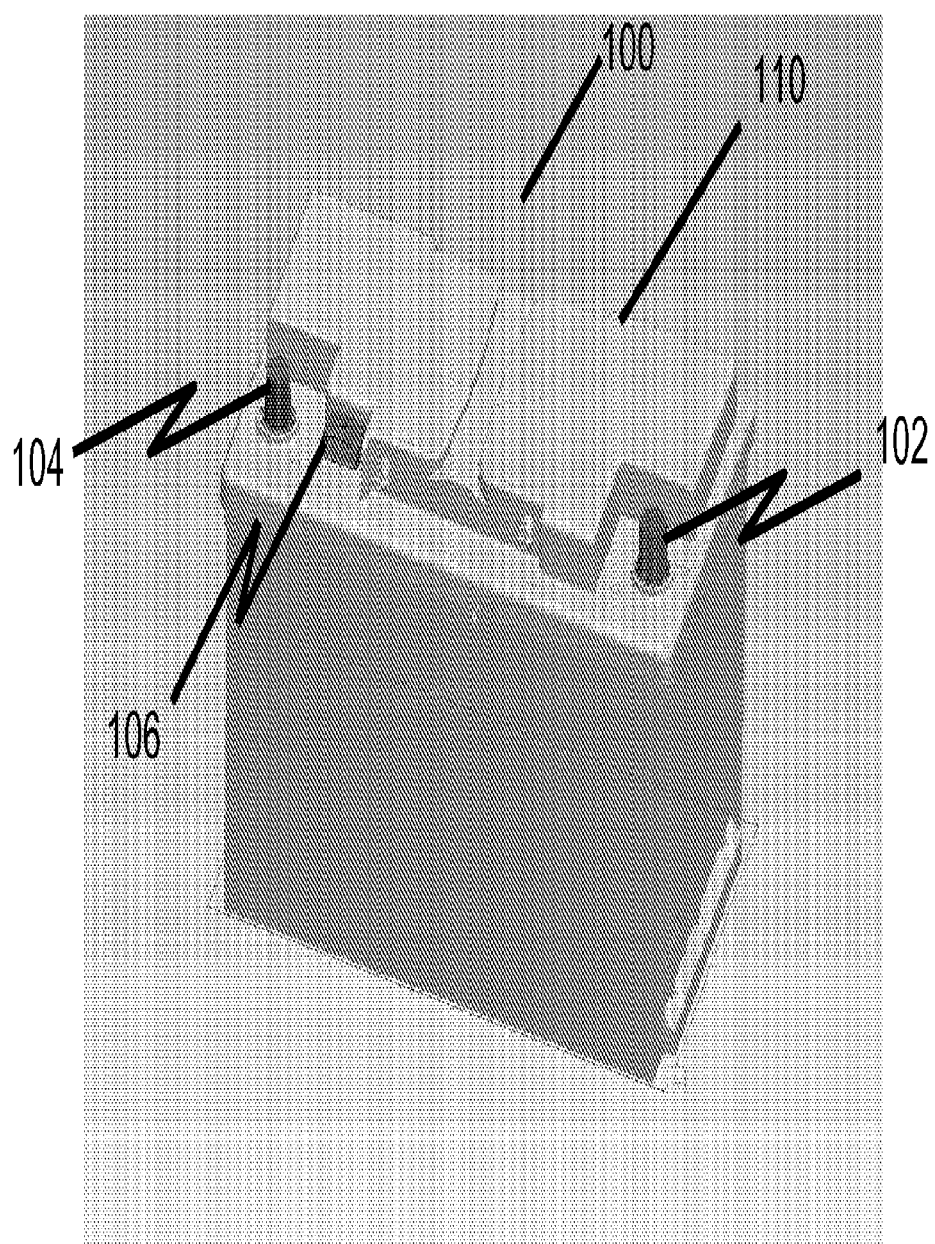
FIG. 1 shows an automotive battery.

FIG. 1 shows an automotive battery 100 with a outer case 110, a negative terminal 102 and a positive terminal 104, and a LIN (Local Interconnect Network) management interface 106 which is a connector for coupling to a LIN within the vehicle. Case 110 is molded, and lead-free terminals 102 and 104 are insert-molded in place on the case. The case consists of a top cover that includes the terminals, and an enclosure base.

Figure 2:
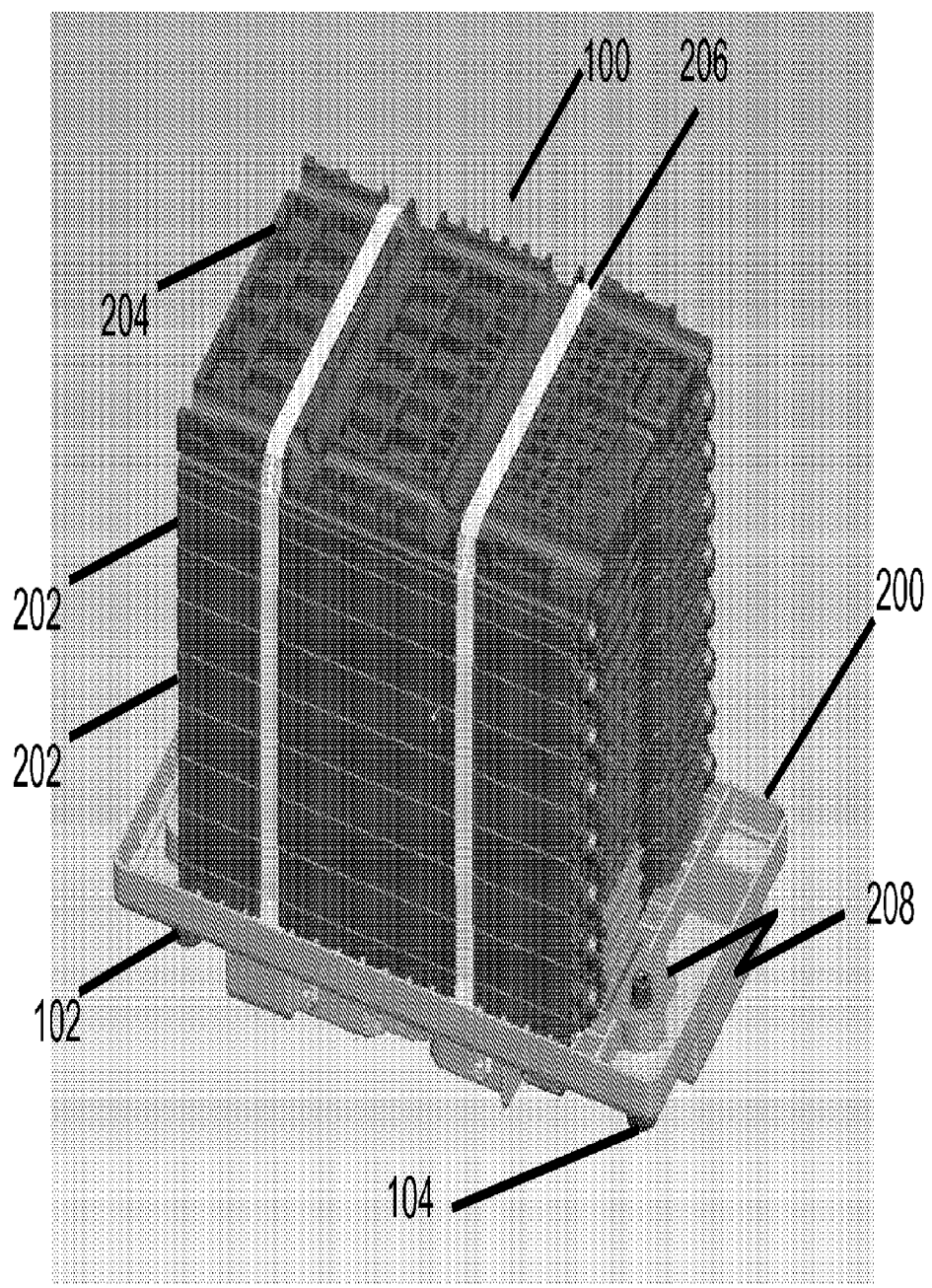
FIG. 2 shows an automotive battery with the outer casing removed and cell sub-assemblies exposed.

FIG. 2 shows the inside of automotive battery 100 with the enclosure case removed. The battery is shown from a perspective rotated 180 degrees upside-down in relation to FIG. 1. The battery contains one or more cell subunits 202. As described in more detail in the related application identified above, the cell subassemblies are a basic building block from which automotive batteries of arbitrary scales may be constructed. The cell subassemblies contain Li-Ion prismatic battery cells (not visible), each of which provides a portion of the battery's electrical power and storage capacity. The cell subassemblies 202 are held together by pressure plate 204, top cover 200, and bands 206. The individual battery cells are electrically connected in parallel and/or series by busbars (described in the related application) which connect the cells to one another and to the terminals of the battery. One such busbar 208 is shown in FIG. 2 connecting one respective terminal of each of four different battery cells together. Busbar 208 also connects the four terminals to positive terminal 104.

The prismatic automotive battery described herein has a group of identical cells. The quantity of cells per module and the module's electrical connection configuration (parallel count versus series count) defines the module's electrical characteristics and performance ratings. For example, battery 100 is configured in a '4S4P' configuration which has 16 cells in four subgroups, where the subgroups are electrically connected in series, and with four cells in each subgroup that are electrically connected in parallel. Depending on the configuration, automotive batteries may contain either an even or an odd number of battery cells.

Figure 3:
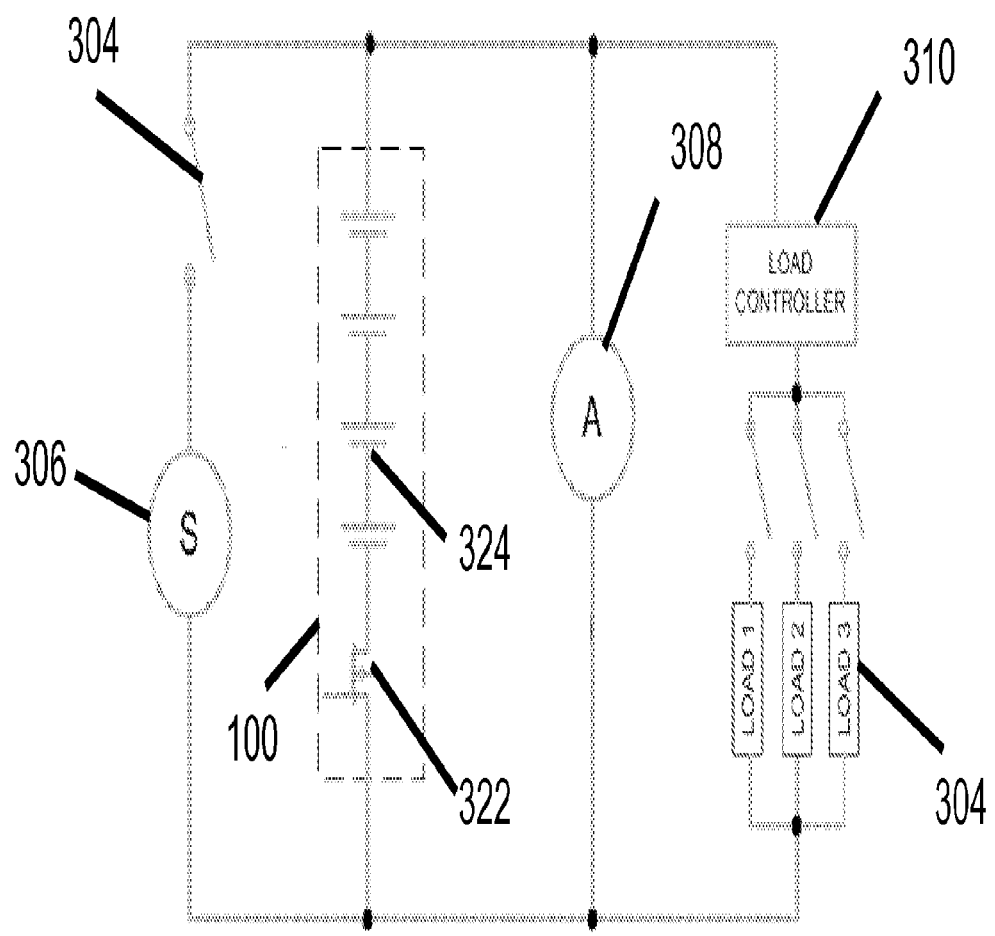
FIG. 3 shows a system level block diagram of an automotive power system.

FIG. 3 shows a system-level block diagram of battery 100 within an automotive electrical system. Battery 100 comprises several battery cell subunits 324 and a cutoff component 322. Here, each subunit 324 represents a group of four parallel battery cells making up the 4S4P battery. Battery 100 is connected in parallel with a combination of a starting solenoid switch 304 and starter motor 306. Battery 100 also is connected in parallel with an alternator 308, used to charge the battery. Alternator 308 has a control input for controlling its output power, which is connected directly or indirectly to the battery's LIN interface (not shown). Battery 100 is shown as four battery cell elements in series, internal to the battery housing. Although battery 100 uses an electronic power management system to maintain balance between individual battery cells and to detect cell voltage, the internal cutoff component 322 is used as a last resort to protect the battery from alternator runaway or other abusive overcharging. Internal cutoff component 322 also may be used to prevent damage to the battery due to over discharge.

Load controller 310 selects one or more electrical loads 304 to be connected in parallel to and driven by battery 100. Load controller 310 can disconnect one or more loads to implement load shedding in situations where the battery cannot provide a sufficiently high voltage if connected to all of the loads. The load controller may shed loads automatically or in response to a request from the battery power management system (described in more detail below) through the battery's LIN interface. In some embodiments, one or more loads may be directly connected in parallel with battery 100 without being connected in series with a load controller.

Power Management System

FIG. 4 shows a component-level view of battery 100, including power management system 400, battery cell assembly 320, LIN interface 106, fuse 420, and cutoff component 322. Battery cell assembly 320 is electrically connected in series with cutoff component 322 and fuse 420. Power management system 400 is connected directly or indirectly through an intermediate analog-to-digital interface to battery cell assembly 320, and is communicatively connected to LIN interface 106 and to cutoff component 322. Power management system 400 provides several capabilities, including external charge control, external load control and internal charge and discharge control. As used herein, "integral part of the battery" refers to devices and/or components that are part of the overall battery assembly, including components that are within the battery enclosure defined by the housing as well as components that attached or affixed to the outside of the housing.

Specifically, power management system 400 includes microprocessor 402, which is configured through firmware to perform the following functions, some of which are described in more detail in subsequent sections:

1. Provide input protection and control of charging, including over-voltage and over-current protection
2. Provide under-voltage protection by control of external load-shedding or by active control of an in-line cutoff switch
3. Sense and supervise the overall battery voltage, including active control of an in-line cutoff switch to limit the current though and voltage across the battery
4. Sense individual battery cell temperature
5. Sense individual battery cell voltage
6. Control each battery cell's connection to individual small resistive loads placed in parallel with each cell in order to balance the cell's voltages within battery cell assembly 320
7. Enable/disable circuitry to decrease current consumption
8. Determine control signals for the alternator
9. Process watchdog timing signals as a failsafe mechanism to ensure the power management system is operating and
10. Interact with external components through a LIN and/or RS232 interface and/or other digital or analog signals.

External Charge Control

Power management system 400 communicates directly or indirectly to the automobile's alternator to externally control the amount of charge current passed from the alternator to the battery. In this manner, the battery pack is able to optimize the amount of current flow to externally control the battery's state of charge. This is accomplished by the power management system internally monitoring the voltage, current, temperature, and other relevant parameters of the system. Microprocessor 402 processes this information to determine appropriate charging parameters, and then communicates to and/or controls the alternator to increase or decrease the amount of charge current into the battery pack.

External Load Control

Power management system 400 communicates with the automobile's body/load controller to control the amount of discharge current to control the battery's state of charge. In this manner, the battery pack is able to optimize the amount of current flow to control the battery's state of charge. This also is accomplished by the power management system internally monitoring the voltage, current, temperature, and other relevant parameters of the system. Microprocessor 402 processes this information to determine appropriate charging parameters, and then communicates to and/or controls the load controller to increase or decrease the discharge current from the battery by selectively connecting or disconnecting certain loads to to/from the battery.

Internal Current Control

In addition to the above external control of the battery's state by controlling the battery's external power sources and loads, power management system 400 also detects and actively prevents excessive current flow through the battery in order to protect the battery. Microprocessor 402 internally monitors the voltage, current, temperature, and other relevant parameters of the battery system. Microprocessor 402 uses this information to control a high power cutoff switch (described below) to actively control the flow of current through the battery pack.

Cutoff Component

As part of performing the above functions, the microprocessor 402 is configured to control and monitor a cutoff component 322 that can be used to selectively connect or disconnect the battery from the load(s) connected to its terminals. Cutoff component 322 provides over-voltage, under-voltage, over-current and over-temperature protection for the battery system. Cutoff component 322 is effectively, a switch either bi-directional or uni-directional, that can be used to control whether the cells in battery cell assembly 320 are electrically connected to the terminals for charging, and separately control this connection for discharging. Cutoff component 322 also may be configured to be a uni-directional switch, only used to control battery charging.

As shown in FIG. 4A, cutoff component 322 includes two groups of parallel arranged MOSFET devices 432 and 434 connected in series. Power management system 400 operates each group of MOSFET devices 432 and 434 as a single switch to selectively allow or disallow current flow to or from the battery, depending on whether the MOSFETs are switched to an On or Off state. Because the MOSFET groups 432, 434 are arranged in series, the MOSFETs, one MOSFET group controls whether current can flow in a direction that charges the battery, and the second group controls whether current can flow in a direction that discharges the battery. Therefore, the series arrangement of the two groups creates a bi-directional switch. The parallel arrangement of the MOSFETs within each group splits the current flow across the MOSFETs, allowing the use of MOSFETs with lower current-carrying ratings than the maximum currents expected for charging and discharging of the battery. Examples of ruggedized MOSFETS for this application include the Infineon IPB180N03S4L-H0 and IPB180N03S4L-01, the International Rectifier IRF2804SPBF, and the Fairchild FDB8860.

Each MOSFET is electrically connected in parallel with the other MOSFETS within its group, with its drain and source terminals oriented so that when the MOSFET is in an On state, current is allowed to flow to charge/discharge the battery. The gate terminals of each MOSFET in a group are connected together to effect a single switching control. The two groups of parallel MOSFETs are electrically connected in series with each other and in series with the battery cells within the battery. The MOSFETS also are closely thermally coupled to the cells and to each other with one or more conductors, as is described in more detail below.

When only one MOSFET group is switched to its Off state, the current is effectively blocked in one direction. Current may still flow in the opposite direction. This occurs because each MOSFET effectively has a body diode which allows current to flow in one direction, but not in the other (unless the MOSFET is in its On state). A separate diode may also be connected in parallel with each group of MOSFETs to provide an additional current path around the MOSFET group when the current flows in the opposite direction to that controlled by the group.

Cutoff component 322 can provide an indication of the current flow through the component (and thus of the current through the battery) in a number of ways. According to one approach, a current sensor (not shown) is placed in series with the two groups of MOSFET devices so as to sense the current flowing through the cutoff component. Instead of using a current sensor, a less expensive shunt resistor 436 of known resistance is placed in series with the switches, as shown in FIG. 4A. The voltage across this shunt resistor 436 will be directly proportional to the current. The microprocessor simply computes the current by dividing the measured voltage by across the shunt resistor by the known resistance of shunt resistor 436.

Figure 4B:
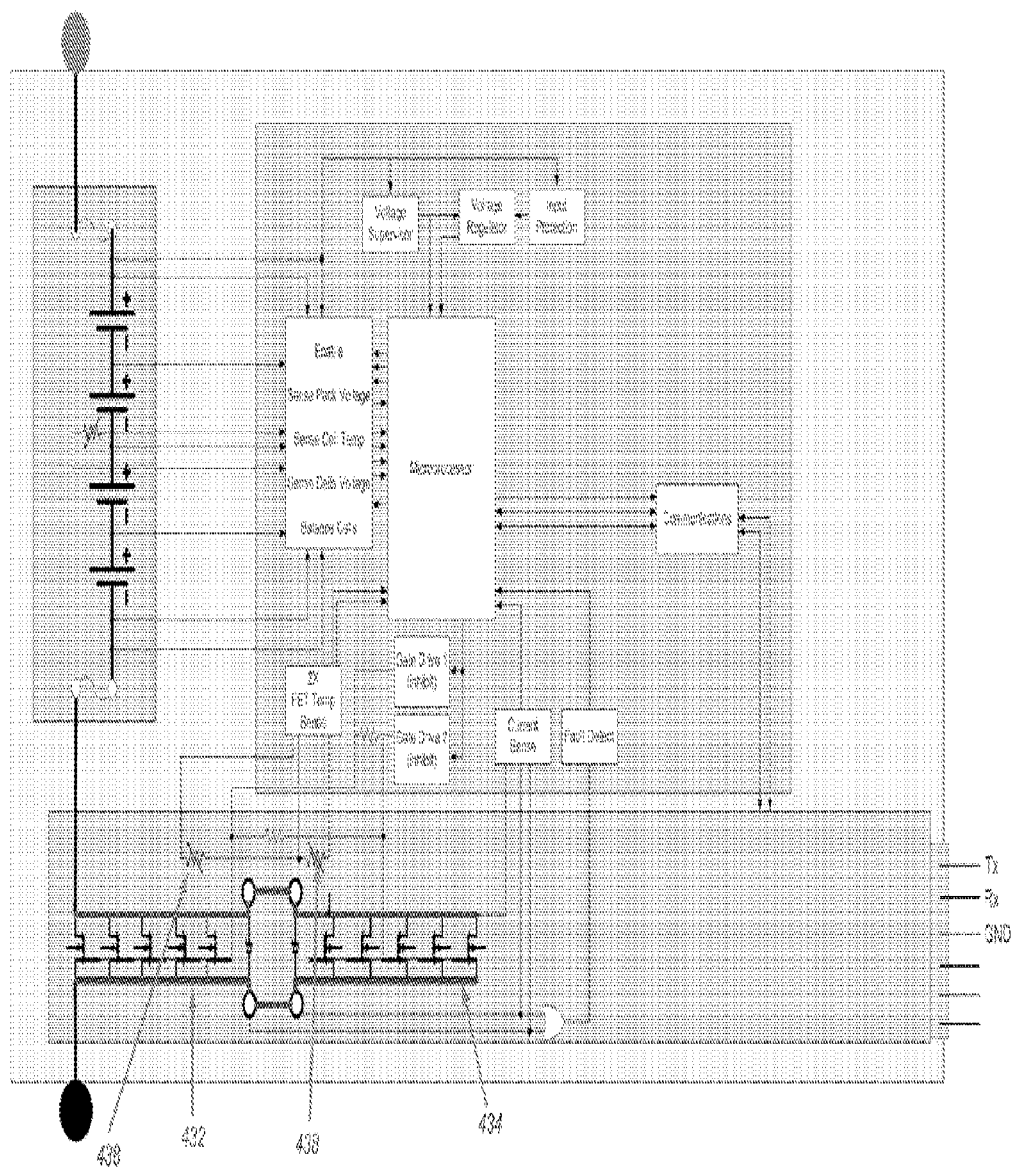
FIG. 4B shows a power management system for an automotive battery.

Another approach, which is shown in FIG. 4B, is to simply measure the voltage across the MOSFETs and then determine the drain-source resistance of a MOSFET in its On state ($R_{DS(on)}$) by measuring the temperature of the MOSFET. This is accomplished by using temperature measuring devices 438 packaged in close thermal proximity to the MOSFET devices, which are themselves packaged in close thermal proximity to each other. Further, FIG. 4B depicts the two groups of MOSFETs 432, 434 connected in parallel. Because the MOSFETs 432, 434 are connected in parallel, this is a uni-directional protection scheme. Specifically, FIG. 4B depicts a device for protecting against over voltages or over charging.

According to this second approach, power management system 400 uses the measured temperature to determine a temperature-calibrated $R_{DS(on)}$, which is the used to convert the voltage measured across the drain-source terminals into a current without the need for a relatively expensive precision current sensor. To measure current, the system measures the voltage across the drain and source of the MOSFETs ($V_{DS}$). If the resistance ($R_{DS}$) of the MOSFETs is known, the current is calculated as [$V_{DS}/R_{DS}$]. In general, however, the resistance of MOSFETs will vary significantly with temperature. Temperature variations can occur due to changes in ambient temperature or from power being dissipated within the device (i.e., current flow through the device). To account for this, the MOSFET resistance is found and calculated the following way:

$$Resistance = R_i + \Delta R_t,$$

where $R_i$ is the initial resistance and $\Delta R_t$ is the change in resistance due to temperature.

First, the initial resistance is found via calibration during the battery pack manufacturing process. Specifically, a known current ($I_a$) is applied at a constant temperature and $V_{DS}$ is measured precisely. The initial resistance ($R_i$) is found to be $V_{DS}/I_a$. Second, the change in resistance due to temperature can be determined in several ways, including:

1. By direct measure (i.e. measuring the temperature of the device).
2. By deducing the change in temperature.

The second method involves measuring the change in ambient temperature, determining the power dissipation within the device, and inferring the resultant temperature. The ambient temperature is measured at a convenient and more cost-effective location. The power dissipation within the device is determined with empirical study, based on the amplitude and duration of current through the device ($P=I^2t$).

Figure 5:
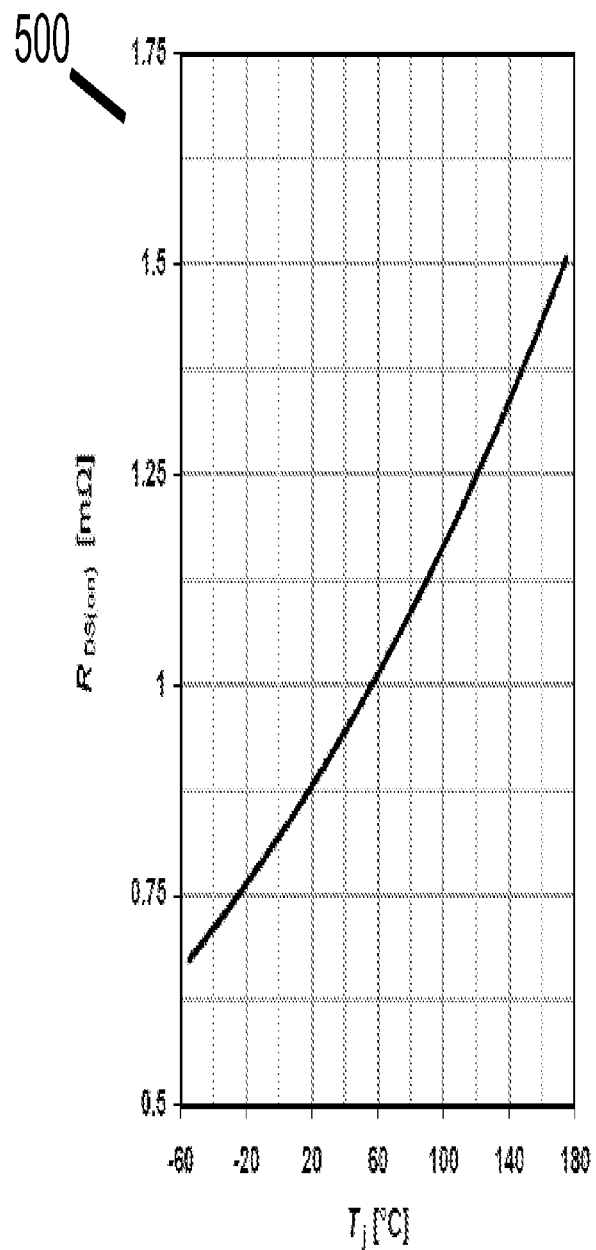
FIG. 5 shows a resistance-temperature relationship for a MOSFET (metal-oxide-semiconductor field-effect transistor) device.

Once the temperature of the MOSFET is determined, the resistance is inferred based on the resistance-temperature relationship listed in the datasheet for the particular device or through empirical study. An example of the resistance-temperature relationship 500 for a MOSFET is shown in FIG. 5.

These computations are all carried out by an appropriately programmed microprocessor 402.

Scalable Architecture of the Cutoff Component

Figure 6:
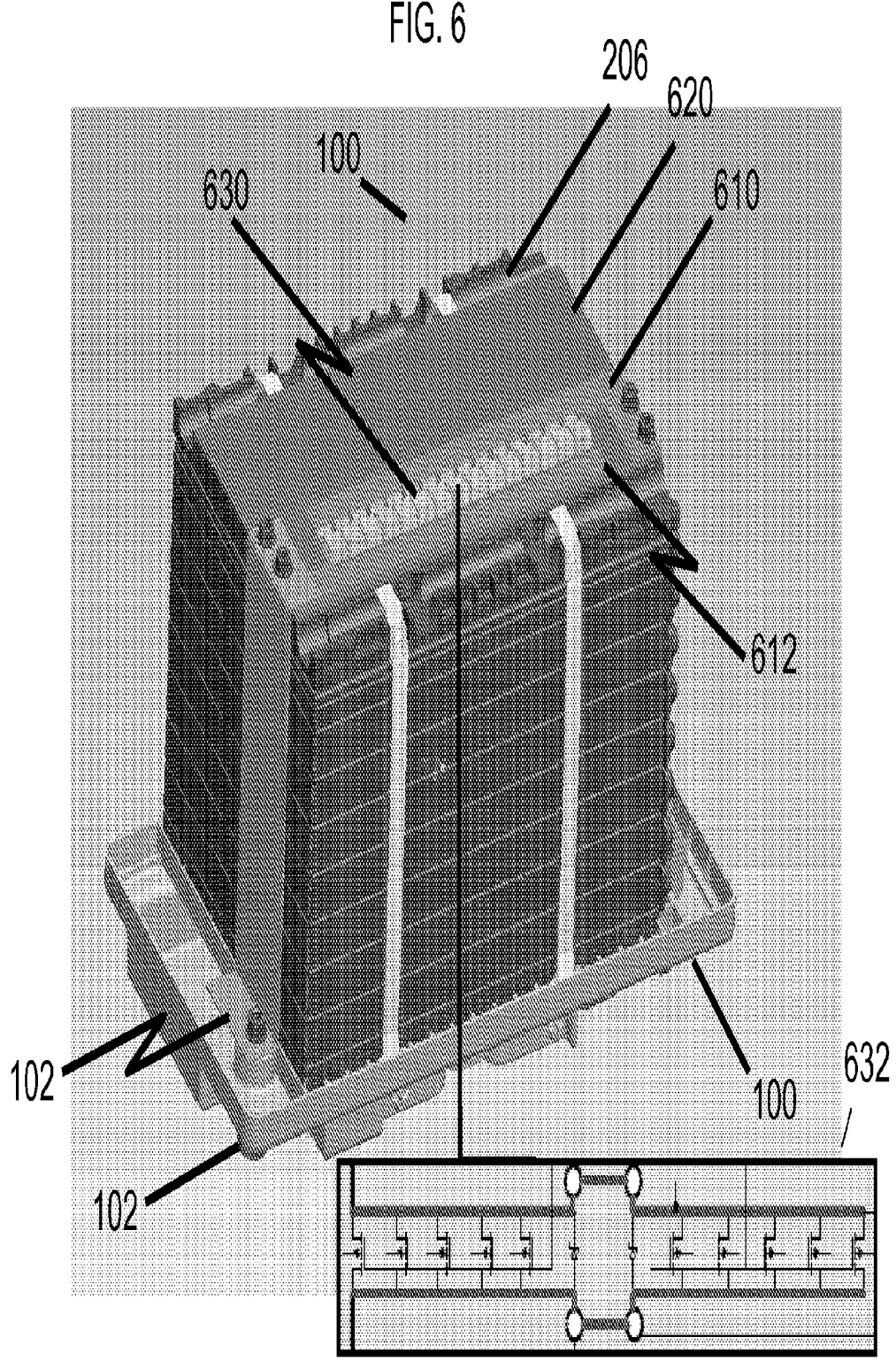
FIG. 6 shows a scalable cutoff component integrated into an automotive battery.

FIG. 6 shows a cutoff component built with a scalable architecture and integrated into one of the busbars 102 of battery 100. The MOSFET devices 630 are positioned between two long conductors 610, 612 that make up a portion of the busbar. The conductors and MOSFETs are also positioned on a printed circuit board 620 or a similar substrate. The two conductors are selected and configured to provide close thermal coupling between the MOSFETs and the temperature sensors (not visible). The MOSFET devices are chosen in part so that the drain and source terminals are on opposite sides of the device, with each attached to a respective one of the conductors of the busbar 610, 612. This configuration creates a scalable architecture for the cutoff component 322 that complements the scalable architecture of the rest of the battery. In other words, one can readily change the size and/or performance of the module by simply adding or subtracting identical parts or subassemblies, e.g., the MOSFETs. The orientation of the MOSFETs is easily configured to accommodate either uni-directional (e.g., to prevent charging) or bi-directional (e.g., to prevent charging and discharging) protection for the battery by simple orientation of the MOSFETs. The number of MOSFETs can easily be adjusted in the design in order to accommodate differing current limits of the battery in relation to the individual current-carrying capacities of the MOSFETs.

The particular arrangement shown in FIG. 6 involves two sets of parallel connected MOSFETs 632 that are oriented to shut off the discharge current (also shown in FIG. 4B). By reversing the orientations of the MOSFETs, they will provide a shut-off control for the charging current. By using two sets connected in series, as illustrated in FIG. 4A, they will provide shut-off for both charging and discharging. This latter arrangement is achieved by simply configuring two sets of parallel bus bars connected appropriately.

The cutoff component and/or power management system also may be used separately from the battery. Systems of multiple batteries that use just a single series cutoff component and/or power management system also may be used, for example, in telecom applications. While the specification has been directed to an automotive battery embodiment, the power management system and cutoff switch disclosed herein can be used in any battery application that requires power management and monitoring. For example, a battery used in a telecommunications application could implement the described power management system and cutoff switch.

While examples of the present invention have been shown and described, it will be readily apparent to those skilled in the art that various changes and modifications may be made therein without departing from the scope of the invention.

The invention claimed is:

1. A battery system comprising:
    a battery housing with first and second voltage output terminals;
    a plurality of rechargeable battery cells within the battery housing and having first and second voltage terminals;
    a power management system for generating an external control signal and an internal control signal based upon monitored operating parameters of the plurality of rechargeable battery cells, said external control signal for controlling an external power source and/or an external load, said power management system forming an integral part of the battery system;
    a cutoff switch circuit within the battery housing and for making and breaking a conductive path between the first voltage terminal of the plurality of battery cells and the first voltage output terminal of the battery housing in response to the internal control signal from the power management system, where the cutoff switch circuit comprises temperature sensing devices and a plurality of metal-oxide semiconductor field effect transistors (MOSFETs) arranged as parallel groups of MOSFETs and operating as a single switch; and
    a controller including executable instructions stored in non-transitory memory to measure a voltage across the MOSFETs, determine a drain-source resistance of one MOSFET in the plurality of MOSFETs from a temperature of the one MOSFET sensed via one of the temperature sensing devices, and determine current flow through the one MOSFET based on the voltage across the MOSFETs and the drain-source resistance of the one MOSFET.

2. The battery system of claim 1, further comprising two busbars electrically coupling the plurality of rechargeable battery cells to the first and second voltage output terminals, wherein the battery cells are lithium ion cells, and wherein the MOSFETs are integrated into one of the busbars between the first and second voltage output terminals and a battery cell stack comprising the plurality of rechargeable battery cells.

3. The battery system of claim 1, wherein the power management system includes additional instructions to selectively activate the cutoff switch circuit in response to current flow through the one MOSFET determined based on the voltage across the MOSFETs and the drain-source resistance of the one MOSFET.

4. The battery system of claim 3, wherein the power management system includes additional instructions to determine current flow through the one MOSFET via dividing the voltage across the MOSFETs by the drain-source resistance of the one MOSFET.

5. The battery system of claim 1, wherein the plurality of MOSFETs is a first group of MOSFETs, and where the first group of MOSFETs is connected in parallel with a second group of MOSFETs connected in parallel with each other and wherein the first group is connected in series with the second group.

6. The battery system of claim 1, further comprising a busbar in electrical communication with the plurality of rechargeable battery cells and the plurality of MOSFETs.

7. The battery system of claim 1, further comprising a shunt resistor in electrical communication with the plurality of MOSFETs.

8. The battery system of claim 4, further comprising additional instructions to determine the drain-source resistance based on an initial resistance of the one MOSFET and a change in resistance of the one MOSFET due to temperature.

9. The battery system of claim 8, wherein a battery is an automotive battery, and further comprising additional instructions to determine the change in resistance of the one MOSFET due to temperature based on power dissipation within the one MOSFET.

10. The battery system of claim 9, wherein the external power source comprises an alternator.

11. The battery system of claim 1, wherein a battery is a telecommunications battery.

\* \* \* \* \*